United States Patent
Funamoto

(10) Patent No.: US 9,426,380 B2
(45) Date of Patent: Aug. 23, 2016

(54) CAMERA HAVING A LIGHT CORRECTION UNIT TO CORRECT THE LIGHT QUANTITY OF ABNORMAL PIXELS AND AN IMAGE PROCESSING METHOD

(71) Applicant: Seiko Epson Corporation, Tokyo (JP)

(72) Inventor: Tatsuaki Funamoto, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/579,250

(22) Filed: Dec. 22, 2014

(65) Prior Publication Data
US 2015/0189139 A1 Jul. 2, 2015

(30) Foreign Application Priority Data
Dec. 26, 2013 (JP) .................................. 2013-268713

(51) Int. Cl.
| | | |
|---|---|---|
| H04N 5/217 | (2011.01) | |
| H04N 5/235 | (2006.01) | |
| H04N 5/232 | (2006.01) | |
| G01J 3/26 | (2006.01) | |
| G01J 3/28 | (2006.01) | |
| G01J 3/32 | (2006.01) | |

(52) U.S. Cl.
CPC .............. *H04N 5/2354* (2013.01); *G01J 3/26* (2013.01); *G01J 3/28* (2013.01); *G01J 3/2803* (2013.01); *G01J 3/32* (2013.01); *H04N 5/23229* (2013.01)

(58) Field of Classification Search
CPC ................................................... H04N 5/2354
USPC ....................................................... 348/241
See application file for complete search history.

(56) References Cited

U.S. PATENT DOCUMENTS

| | | | |
|---|---|---|---|
| 6,614,533 B1 | 9/2003 | Hata | |
| 2005/0244073 A1* | 11/2005 | Keshet | G06T 5/002 382/260 |
| 2006/0256045 A1* | 11/2006 | Jeon | G09G 3/22 345/74.1 |
| 2009/0027518 A1 | 1/2009 | Kita | |
| 2011/0261351 A1* | 10/2011 | Treado | G01J 3/32 356/73 |
| 2012/0189328 A1 | 7/2012 | Suzuki et al. | |

FOREIGN PATENT DOCUMENTS

| | | |
|---|---|---|
| EP | 1703720 A2 | 9/2006 |
| JP | 2000-329617 A | 11/2000 |
| JP | 2006-270919 A | 10/2006 |
| JP | 2009-033222 A | 2/2009 |
| JP | 2012-155042 A | 8/2012 |

* cited by examiner

*Primary Examiner* — Usman Khan
(74) *Attorney, Agent, or Firm* — Harness, Dickey & Pierce, P.L.C.

(57) ABSTRACT

A spectroscopic analyzing apparatus includes a light source unit that applies light to an imaging object, an imaging unit that acquires an image by imaging the light reflected by the imaging object, pixel detection part for detecting abnormal pixels having ratios in respective pixels of the image equal to or more than one and normal pixels having the ratios less than one, and light quantity correction part for calculating light quantity correction values based on the light quantities of the normal pixels in a pixel area containing the abnormal pixels of the image and replaces the light quantities of the abnormal pixels by the light quantity correction values, wherein the light quantity correction part calculates the light quantity correction values by polynomial approximation based on the light quantities of the normal pixels located within a predetermined distance range.

10 Claims, 10 Drawing Sheets

CAMERA HAVING A LIGHT CORRECTION UNIT TO CORRECT THE LIGHT QUANTITY OF ABNORMAL PIXELS AND AN IMAGE PROCESSING METHOD

BACKGROUND

1. Technical Field

The present invention relates to a camera and an image processing method.

2. Related Art

In related art, apparatuses that obtain an imaged images by applying light to imaging objects and imaging the light reflected by the imaging objects have been known (for example, see JP-A-2009-33222.

An imaging apparatus (spectroscopic camera) disclosed in JP-A-2009-33222 acquires a spectral image by allowing light from an object to enter a Fabry-Perot interference filter and receiving the light transmitted through the Fabry-Perot interference filter using an image sensor.

As disclosed in JP-A-2009-33222, the spectroscopic camera using the Fabry-Perot interference filter has an advantage that reduction in size and weight may be realized. On the other hand, in order to acquire a spectral image in the near-infrared region in a sufficient quantity of light, it is necessary to provide a near-infrared light source in the imaging apparatus main body. However, when the light source is provided for the compact spectroscopic camera, the distance between the light source and the imaging lens becomes smaller, and there is a problem that the light specularly reflected by the surface of the imaging object enters the imaging lens and brightness abnormality occurs in a part of the spectral image.

SUMMARY

An advantage of some aspects of the invention is to provide a camera that can acquire an image with high accuracy even when light from a light source is specularly reflected by a surface of an imaging object and an image processing method.

A camera according to an aspect of the invention includes a light source unit that applies light to an imaging object, an imaging unit that acquires an image by imaging the light reflected by the imaging object, a pixel detection unit that detects abnormal pixels having ratios of light quantities in respective pixels of the image with respect to a reference light quantity obtained when light is applied to a reference object equal to or more than a predetermined value and normal pixels having the ratios less than the predetermined value, and a light quantity correction unit that calculates light quantity correction values based on the light quantities of the normal pixels located within a predetermined distance range from the abnormal pixels of the image and replaces the light quantities of the abnormal pixels by the light quantity correction values, wherein the light quantity correction unit calculates the light quantity correction values by polynomial approximation based on the light quantities of the normal pixels located within the predetermined distance range.

Here, the reference object in the aspect of the invention is, e.g., a reference white plate or the like having a surface of a perfect diffusing surface or closer to the perfect diffusing surface. When light is applied to the perfect diffusing surface and the light quantity of the reflection light is used as the reference light quantity, the ratios of the light quantities of the respective pixels in the imaged image with respect to the reference light quantity are reflectance ratios with reference to the perfect diffusing surface. The part in which specular reflection occurs on the surface of the imaging object has reflectance exceeding the reflectance on the perfect diffusing surface, and the reflectance ratio is a value exceeding "1". Thereby, the pixel detection unit may detect the abnormal pixels corresponding to specular reflection parts and normal pixels corresponding to the diffuse reflection parts.

Note that the reference light quantity is not limited to the reflected light quantity with respect to the perfect diffusing surface. For example, there may be partial absorption or the like on the surface of the reference object. In this case, the reflectance is a finite value less than 100% (e.g., 99%). In the case where the reflected light quantity by the reference object is used as the reference light quantity, if the reflectance ratio exceeds a predetermined value equal to or less than one (e.g., 0.99), the pixel detection unit may detect an abnormal pixel corresponding to specular reflection.

In the aspect of the invention, the abnormal pixels and the normal pixels in the image are detected by the pixel detection unit, the light quantity correction unit calculates the light quantity correction values based on the light quantities of the normal pixels of the pixels around the abnormal pixels, and the light quantities of the abnormal pixels are replaced by the light quantity correction values. The light quantity correction unit calculates the light quantity correction values by polynomial approximation based on the light quantities of the normal pixels located within the predetermined distance range. Thereby, the light quantities of the abnormal pixels may be replaced by the appropriate light quantities, and the image without pixels with abnormal light quantities corresponding to the specular reflection parts may be acquired.

In the camera according to the aspect of the invention, it is preferable that a spectroscopic device that selects light having a predetermined wavelength by spectroscopically separating the light reflected by the imaging object is provided, and the imaging unit acquires an image by imaging the light having the wavelength selected by the spectroscopic device.

In the aspect of the invention with this configuration, as the acquired image, a spectral image formed by imaging light having a predetermined wavelength spectroscopically separated by the spectroscopic device is acquired. In the configuration, the light quantities of the abnormal pixels corresponding to the specular reflection parts in the spectral image may be corrected with the light quantity correction values calculated based on the light quantities of the normal pixels, and the spectral image with higher accuracy may be acquired.

In the camera according to the aspect of the invention, it is preferable that the light quantity correction unit calculates, with respect to an x-axis direction and a y-axis direction of the pixel, light quantity correction values in the x-axis direction and light quantity correction values in the y-axis direction by polynomial approximation, and replaces the light quantity correction values by average values of the light quantity correction values in the x-axis direction and the light quantity correction values in the y-axis direction.

In the aspect of the invention with this configuration, the polynomial approximation in the x-direction and the polynomial approximation in the y-direction are averaged, and thereby, the accuracy may be improved compared to the case of only the polynomial approximation in the x-direction.

In the camera according to the aspect of the invention, it is preferable that a gray level correction unit that performs gray level correction of image data based on the maximum values of the light quantity correction values is provided.

Here, in the specular reflection parts, the light quantities take values for saturated exposure in the imaging device as the upper limit of the light quantities that can be received. On the other hand, when the light quantities are calculated using polynomial approximation, the values exceeding the upper limit may be calculated. In this case, no high-accuracy display can be performed by image display with the upper limit as the maximum gray level.

On the other hand, in the aspect of the invention with the configuration described above, the maximum gray level is obtained based on the maximum value of the calculated light quantity correction values, and thereby, an image with higher accuracy based on the appropriate light quantities may be displayed.

In the camera according to the aspect of the invention, it is preferable that the pixel detection unit detects abnormal pixels with light quantities of the respective pixels having differences from light quantities of pixels adjacent to the respective pixels equal to or more than a predetermined value.

In the aspect of the invention with this configuration, the abnormal pixels with the light quantities of the respective pixels having differences from the light quantities of the pixels adjacent to the respective pixels equal to or more than the predetermined value are detected. Accordingly, compared to the case where all light quantities of pixels equal to or more than a predetermined value are detected as abnormal values, pixels having larger amounts of change in light quantity may be excluded within the pixel area, and the probability of correction of the light quantities of the abnormal pixels using more appropriate light quantities may be higher.

In the camera according to the aspect of the invention, it is preferable that an input unit for setting the predetermined value for determination as to whether the pixels are abnormal pixels or normal pixels is provided.

In the aspect of the invention with this configuration, the input unit for setting the predetermined value is provided, and, for example, the predetermined value may be set by a user operation. Further, if the number of abnormal pixels in the acquired image is equal to or more than a predetermined upper limit, the predetermined value may be automatically changed (e.g., reduced).

In the configuration, for example, in the case where the abnormal pixels are too many in the imaged image and the accuracy of light quantity correction based on the normal pixels is lower or the like, more appropriate light quantity correction may be performed by reducing the detection sensitivity of the abnormal pixels.

In the camera according to the aspect of the invention, it is preferable that an input unit for setting the predetermined distance for determination of a range in which the normal pixels for correction of the light quantities of the abnormal pixels are located.

In the aspect of the invention with this configuration, the input unit for setting the predetermined distance is provided, and, for example, the predetermined distance may be set by a user operation. Further, the predetermined distance may be automatically changed in response to the number of pixels of the other abnormal pixels located around the abnormal pixel of the acquired image, the position of the edge part in which the light quantity largely changes, or the like.

In the configuration, for example, in the case where the predetermined distance set by the user operation is used, the user may set an area containing less abnormal pixels (the predetermined distance) after confirmation of the image. Further, for example, in the case where the distance is automatically set in response to the number of pixels around the abnormal pixel, when the number of abnormal pixels is larger, the predetermined distance may be set to be larger to contain many normal pixels in an area for calculation of the light quantity correction values, and the light quantities of the abnormal pixels may be corrected to normal light quantities with higher accuracy. When the number of abnormal pixels is smaller, the predetermined distance may be set to be smaller to calculate the light quantity correction values based on the normal pixels at the distances closer to the detected abnormal pixels, and thereby, calculation of light quantity correction values with higher accuracy may be performed.

Furthermore, for example, after edge detection or the like, the predetermined distance may be set not to contain the edge part. In this case, the light quantity of the edge part in which the light quantity largely changes is not contained as the light quantity of the normal pixels for calculation of light quantity correction values, and thereby, calculation of light quantity correction values with higher accuracy may be performed.

In the camera according to the aspect of the invention, it is preferable that the spectroscopic device can change the wavelength to be selected.

In the aspect of the invention with this configuration, the wavelength of the light to be spectroscopically separated by the spectroscopic device may be changed, and spectral images corresponding to a plurality of wavelengths may be acquired. Spectral images with higher accuracy corresponding to the respective wavelengths may be acquired by replacement of the light quantities of the abnormal pixels corresponding to the specular reflection parts in the respective spectral images by the light quantity correction values.

In the camera according to the aspect of the invention, it is preferable that the spectroscopic device is a tunable Fabry-Perot etalon.

In the aspect of the invention with this configuration, the tunable Fabry-Perot etalon is used as the spectroscopic device. The tunable Fabry-Perot etalon may be formed in a simple configuration in which a pair of reflection films are oppositely provided and the spectroscopically separated wavelength may be easily changed by changing the gap dimension between the reflection films. Therefore, reduction in size and thickness of the spectroscopic camera may be realized by using the tunable Fabry-Perot etalon compared to the case where a larger spectroscopic device such as an AOTF (Acousto Optic Tunable Filter) or an LCTF (Liquid Crystal Tunable Filter) is used, for example.

An image processing method according to another aspect of the invention is an image processing method in a camera including a light source unit that applies light to an imaging object and an imaging unit that acquires an image by imaging the light reflected by the imaging object, including detecting abnormal pixels having ratios of light quantities in respective pixels of the image with respect to a reference light quantity obtained when light is applied to a reference object equal to or more than a predetermined value and normal pixels having the ratios less than the predetermined value, and calculating light quantity correction values of the abnormal pixels based on the light quantities of the normal pixels in a predetermined pixel area centered around the abnormal pixels of the image and replacing the light quantities of the abnormal pixels by the light quantity correction values, wherein the calculating of the light quantity correction values includes calculating the light quantity correction values by polynomial approximation based on the light quantities of the normal pixels located within a predetermined distance range.

In the aspect of the invention, the abnormal pixels and the normal pixels in the imaged image are detected at the pixel detection, and the light quantity correction values are calculated based on the light quantities of the normal pixels of the pixels around the abnormal pixels and the light quantities of the abnormal pixels are replaced by the light quantity correction values at the light quantity correction. Further, the light quantity correction calculates the light quantity correction values by polynomial approximation based on the light quantities of the normal pixels located within the predetermined distance range. Thereby, like the above-described aspect of the invention, the light quantities of the abnormal pixels may be replaced by the appropriate light quantities, and the image without pixels with abnormal light quantities corresponding to the specular reflection parts may be acquired.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a spectroscopic analyzing apparatus (camera) of one embodiment according to the invention will be explained with reference to the drawings.

Schematic Configuration of Spectroscopic Analyzing Apparatus

Figure 1:
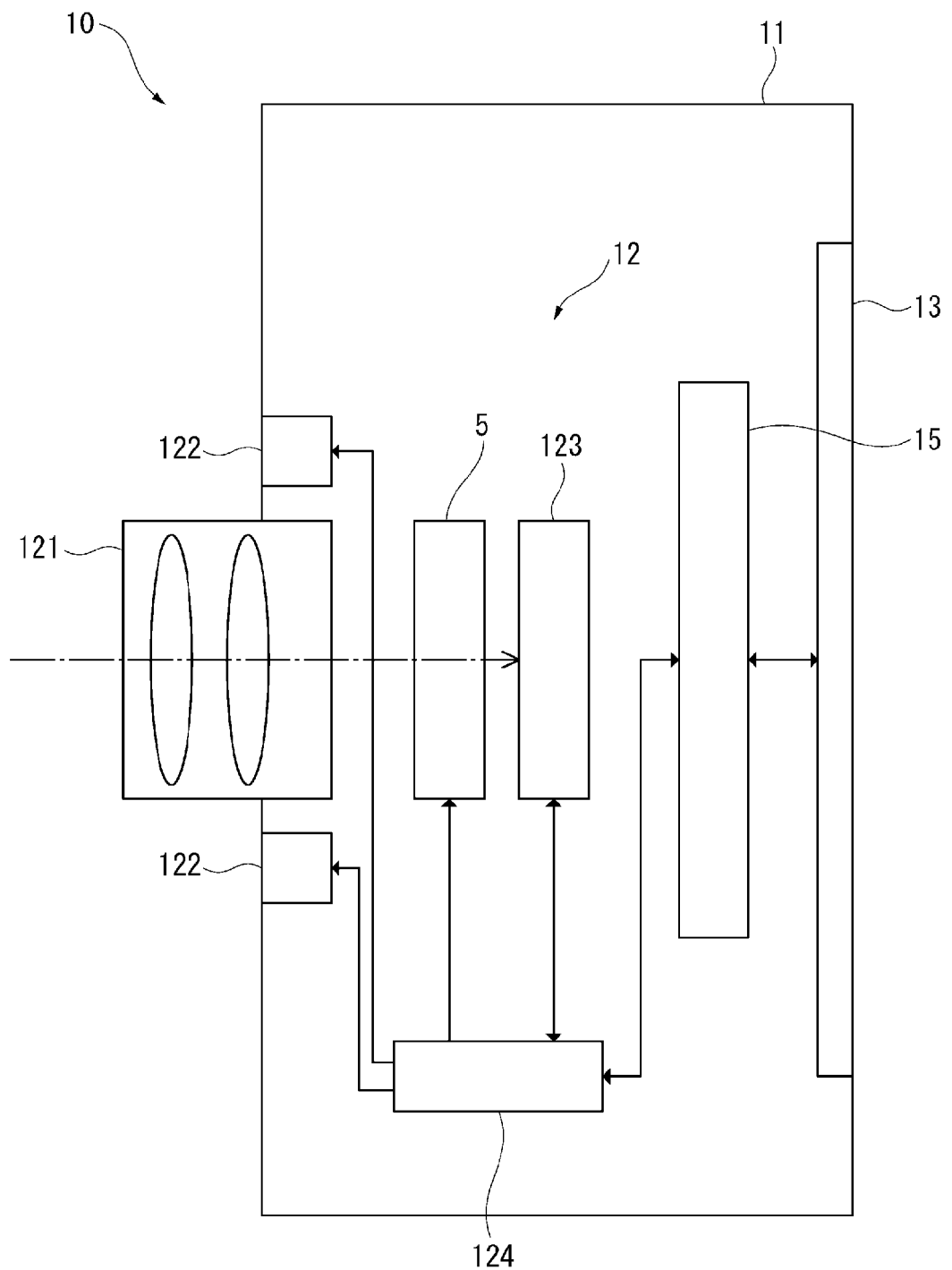
FIG. 1 shows a schematic configuration of a spectroscopic analyzing apparatus of an embodiment according to the invention.
Figure 2:
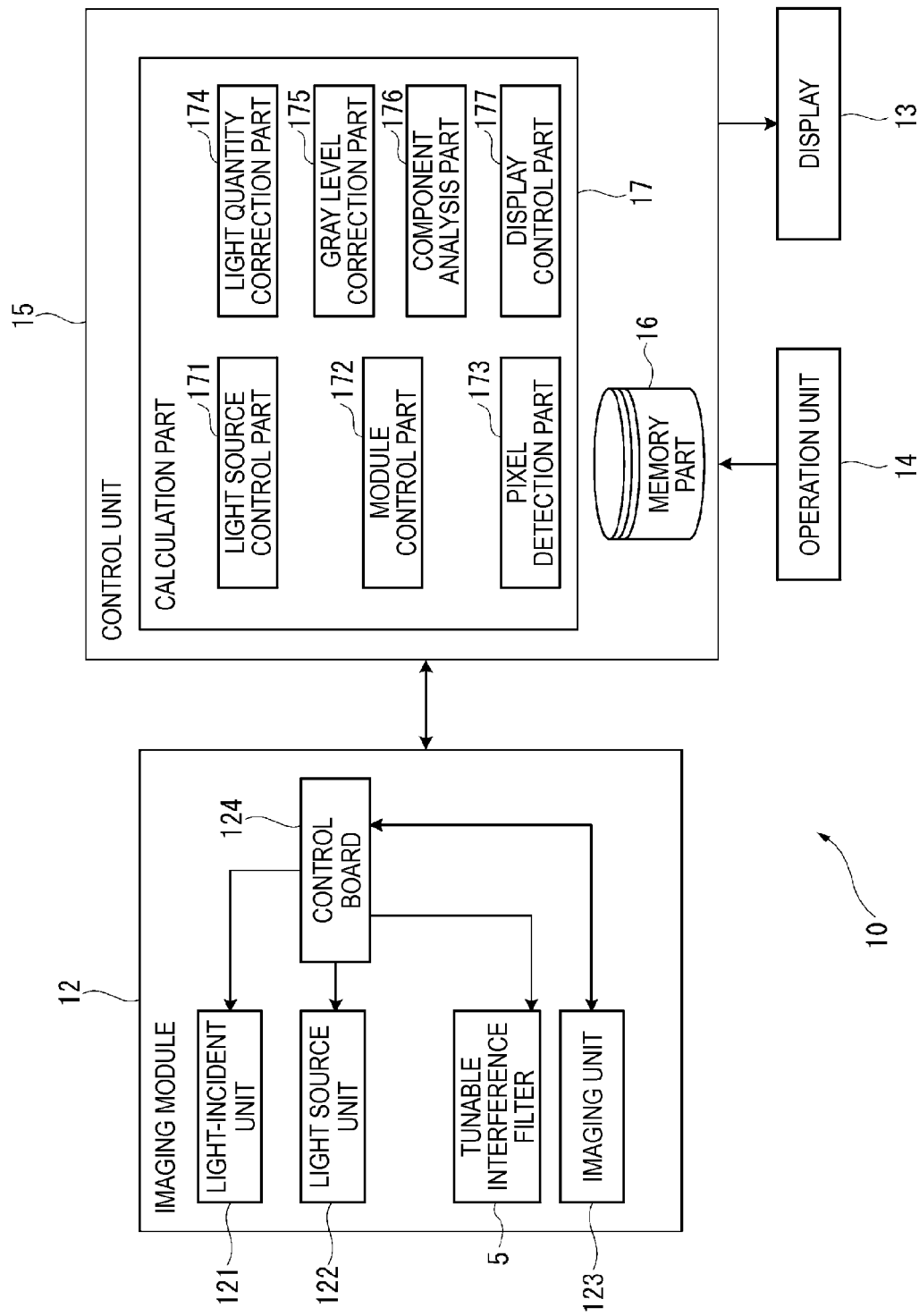
FIG. 2 is a block diagram showing the schematic configuration of the spectroscopic analyzing apparatus of the embodiment.

FIG. 1 is a schematic diagram showing a schematic configuration of a spectroscopic analyzing apparatus of the embodiment. FIG. 2 is a block diagram showing the schematic configuration of the spectroscopic analyzing apparatus.

A spectroscopic analyzing apparatus 10 is a camera according to the invention and an apparatus that images spectral images of an imaging object with respect to a plurality of wavelengths, analyzes spectra in an infrared wavelength region (a target wavelength region of the spectral images) in the respective pixels based on the spectral images, and analyzes components of the imaging object from the analyzed spectra.

As shown in FIG. 1, the spectroscopic analyzing apparatus 10 of the embodiment includes a casing 11, an imaging module 12, a display 13, an operation unit 14 (see FIG. 2), and a control unit 15.

Configuration of Imaging Module

The imaging module 12 includes a light-incident unit 121 (incident system), a light source unit 122, a tunable interference filter 5 (spectroscopic device), an imaging unit 123 that receives incident light, and a control board 124.

Configuration of Light-Incident Unit

As shown in FIG. 1, the light-incident unit 121 includes a plurality of lenses. The viewing angle of the light-incident unit 121 is limited to a predetermined angle or less by the plurality of lenses, and forms an image of an object to be inspected within the viewing angle in the imaging unit 123. Further, with respect to part of the plurality of lenses, distances between lenses may be adjusted by operation of the operation unit 14 by a user, for example, and thereby, the acquired image may be scaled. In the embodiment, as the lenses forming the light-incident unit 121, telecentric lenses are preferably used. In the telecentric lenses, the optical axis of the incident light may be aligned in parallel to the principal ray and allowed to enter perpendicularly to a fixed reflection film 54 and a movable reflection film 55 of the tunable interference filter 5, which will be described later. Further, when the telecentric lenses are used as the lenses forming the light-incident unit 121, a diaphragm is provided in a focal position of the telecentric lenses. The diaphragm diameter is controlled by the control unit 15, and thereby, the diaphragm can control the incident angle to the tunable interference filter 5. Note that the incident angle of the incident light limited by the group of lenses, the diaphragm, etc. varies depending on lens design or the like, and it is preferable that the incident angle is limited to 20 degrees or less from the optical axis.

Configuration of Light Source Unit

As shown in FIGS. 1 and 2, the light source unit 122 applies light toward the imaging object. As the light source unit 122, an LED, a laser beam source, or the like is used. The LED or the laser beam source is used, and thereby, downsizing and power saving of the light source unit 122 may be realized.

Configuration of Tunable Interference Filter

Figure 3:
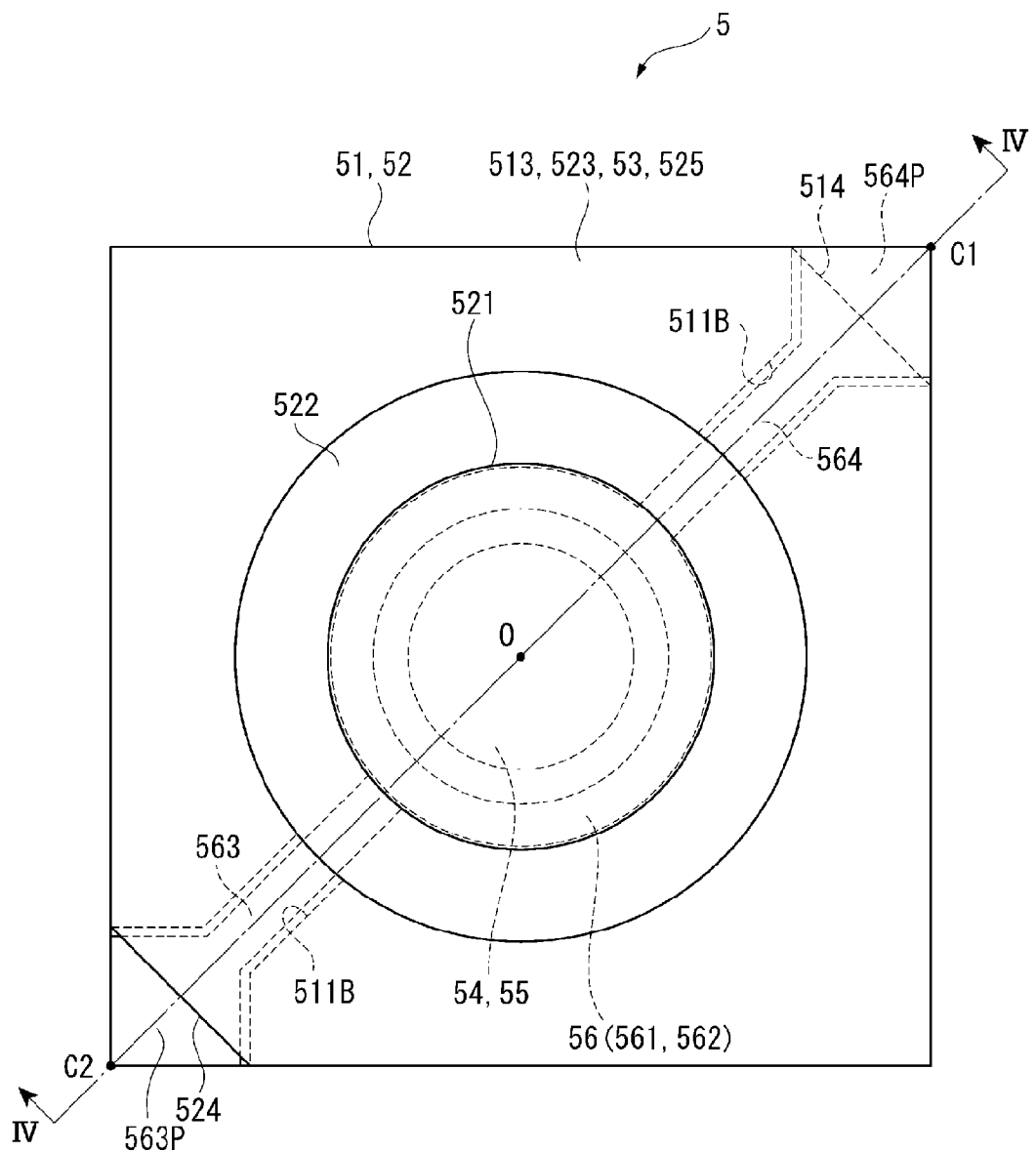
FIG. 3 is a plan view showing a schematic configuration of a tunable interference filter of the embodiment.
Figure 4:
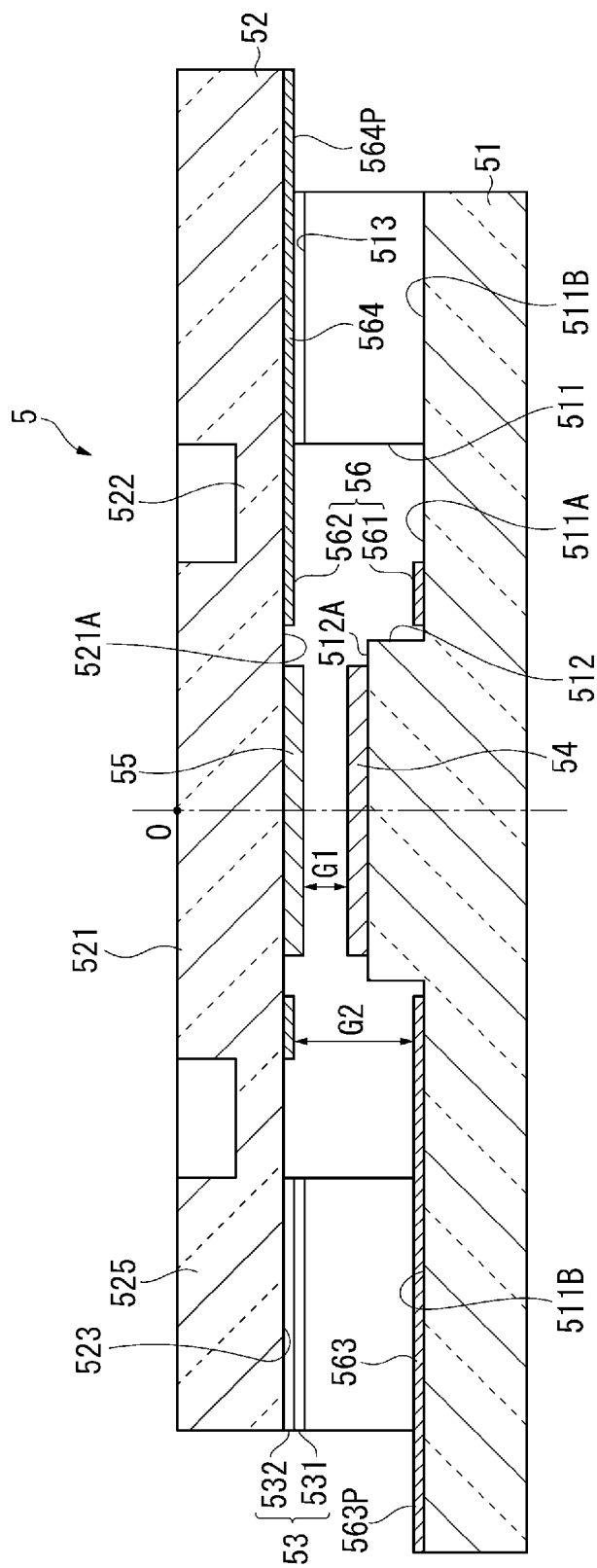
FIG. 4 is a sectional view along a line IV-IV in FIG. 3.

FIG. 3 is a plan view showing a schematic configuration of the tunable interference filter. FIG. 4 is a sectional view of the tunable interference filter along a line IV-IV in FIG. 3.

The tunable interference filter 5 is a Fabry-Perot etalon. The tunable interference filter 5 is an optical member having a rectangular plate shape, for example, and includes a fixed substrate 51 formed in a thickness dimension of e.g., about 500 μm and a movable substrate 52 formed in a thickness dimension of e.g., about 200 μm. These fixed substrate 51 and movable substrate 52 are respectively formed using various kinds of glass including soda glass, crystalline glass, quartz glass, lead glass, potassium glass, borosilicate glass, and alkali-free glass, or crystal, for example. Further, a first joining part 513 of the fixed substrate 51 and a second joining part 523 of the movable substrate 52 are joined by a joining film 53 (first joining film 531 and second joining film 532) including a plasma-polymerized film primarily consisting of siloxane, for example, and thereby, these fixed substrate 51 and movable substrate 52 are integrally formed.

The fixed reflection film 54 is provided on the fixed substrate 51 and the movable reflection film 55 is provided on the movable substrate 52. These fixed reflection film 54 and movable reflection film 55 are provided to be opposed via a gap G1. Further, an electrostatic actuator 56 used for adjustment (change) of the dimension of the gap G1 is provided in the tunable interference filter 5. The electrostatic actuator 56 includes a fixed electrode 561 provided on the fixed substrate 51 and a movable electrode 562 provided on the movable substrate 52. These fixed electrode 561 and movable electrode 562 are opposed via a gap G2. Here, these fixed electrode 561 and movable electrode 562 may be directly provided on the substrate surfaces of the fixed substrate 51 and the movable substrate 52, respectively, or may be provided via other film members. Here, the gap G2 is larger than the gap G1.

Further, in a filter plan view in which the tunable interference filter 5 is seen from the substrate thickness direction of the fixed substrate 51 (movable substrate 52) as shown in FIG. 3, the plane center point O of the fixed substrate 51 and the movable substrate 52 coincides with the center point of the fixed reflection film 54 and the movable reflection film 55 and coincides with the center point of a movable part 521, which will be described later.

In the following explanation, the plan view as seen from the substrate thickness direction of the fixed substrate 51 or the movable substrate 52, i.e., a plan view of the tunable interference filter 5 as seen from the stacking direction of the fixed substrate 51, the joining film 53, and the movable substrate 52 is referred to as "filter plan view".

Configuration of Fixed Substrate

On the fixed substrate 51, an electrode placement groove 511 and a reflection film provision part 512 are formed by etching. The fixed substrate 51 is formed in the larger thickness dimension than the movable substrate 52, and there is no electrostatic attractive force when a voltage is applied between the fixed electrode 561 and the movable electrode 562 or deflection of the fixed substrate 51 due to internal stress of the fixed electrode 561.

Further, a cutout part 514 is formed at an apex C1 of the fixed substrate 51, and a movable electrode pad 564P, which will be described later, is exposed at the fixed substrate 51 side of the tunable interference filter 5.

The electrode placement groove 511 is annularly formed around the plane center point O of the fixed substrate 51 in the filter plan view. The reflection film provision part 512 is formed to project toward the movable substrate 52 side from the center part of the electrode placement groove 511 in the plan view. The groove bottom surface of the electrode placement groove 511 serves as an electrode provision surface 511A on which the fixed electrode 561 is provided. Further, the projected end surface of the reflection film provision part 512 serves as a reflection film provision surface 512A.

Furthermore, on the fixed substrate 51, an electrode extraction groove 511B extending from the electrode placement groove 511 toward the apex C1 and an apex C2 of the outer circumference edge of the fixed substrate 51 is provided.

The fixed electrode 561 is provided on the electrode provision surface 511A of the electrode placement groove 511. More specifically, the fixed electrode 561 is provided in a region opposed to the movable electrode 562 of the movable part 521, which will be described later, of the electrode provision surface 511A. Further, an insulating film for securing insulation between the fixed electrode 561 and the movable electrode 562 may be stacked on the fixed electrode 561.

Furthermore, on the fixed substrate 51, a fixed extraction electrode 563 extending from the outer circumference edge of the fixed electrode 561 in the direction toward the apex C2 is provided. The extending end part (the part located at the apex C2 of the fixed substrate 51) of the fixed extraction electrode 563 forms a fixed electrode pad 563P connected to the control board 124.

Note that, in the embodiment, the configuration in which one fixed electrode 561 is provided on the electrode provision surface 511A is shown, however, for example, a configuration in which two electrodes forming concentric circles around the plane center point O are provided (dual electrode configuration) may be employed.

As described above, the reflection film provision part 512 is formed in a nearly cylindrical shape having a diameter dimension smaller than that of the electrode placement groove 511 coaxially with the electrode placement groove 511, and includes the reflection film provision surface 512A of the reflection film provision part 512 opposed to the movable substrate 52.

As shown in FIG. 4, the fixed reflection film 54 is provided on the reflection film provision part 512. As the fixed reflection film 54, for example, a metal film of Ag or the like, an alloy film of an Ag alloy or the like may be used. Further, for example, a dielectric multilayer film with a high-refractive-index layer of $TiO_2$ and a low-refractive-index layer of $SiO_2$ may be used. Furthermore, a reflection film in which a metal film (or an alloy film) is stacked on the dielectric multilayer film, a reflection film in which the dielectric multilayer film is stacked on a metal film (or an alloy film), a reflection film in which a single-layer refractive layer ($TiO_2$, $SiO_2$, or the like) and a metal film (or an alloy film) are stacked, or the like may be used.

Further, on the light-incident surface of the fixed substrate 51 (the surface without the fixed reflection film 54), an anti-reflection film may be formed in a location corresponding to the fixed reflection film 54. The anti-reflection film may be formed by alternately stacking low-refractive-index films and high-refractive-index films, and reduces the reflectance and increases transmittance of visible light on the surface of the fixed substrate 51.

In addition, of the surface of the fixed substrate 51 opposed to the movable substrate 52, the surface without the electrode placement groove 511, the reflection film provision part 512, or the electrode extraction groove 511B formed thereon by etching forms the first joining part 513. The first joining film 531 is provided in the first joining part 513 and the first joining film. 531 is joined to the second joining film 532 provided on the movable substrate 52, and thereby, the fixed substrate 51 and the movable substrate 52 are joined as described above.

Configuration of Movable Substrate

The movable substrate 52 includes the movable part 521 having a circular shape around the plane center point O, a holding part 522 that is coaxial with the movable part 521 and holds the movable part 521, and a substrate outer circumference part 525 provided outside of the holding part 522 in the filter plan view as shown in FIG. 3.

Further, on the movable substrate 52, a cutout part 524 is formed in correspondence with the apex C2 as shown in FIG. 3, and the fixed electrode pad 563P is exposed when the tunable interference filter 5 is seen from the movable substrate 52 side.

The movable part 521 is formed to have a thickness dimension larger than that of the holding part 522, and, for example, formed to have the same dimension as the thickness dimension of the movable substrate 52 in the embodiment. The movable part 521 is formed to have at least a diameter dimension larger than the diameter dimension of the outer circumference edge of the reflection film provision surface 512A in the filter plan view. Further, in the movable part 521, the movable electrode 562 and the movable reflection film 55 are provided.

Note that, like the fixed substrate 51, an anti-reflection film may be formed on the surface of the movable part 521 opposite to the fixed substrate 51. The anti-reflection film may be formed by alternately stacking low-refractive-index films and high-refractive-index films, and may reduce reflectance and increases transmittance of visible light on the surface of the movable substrate 52.

The movable electrode 562 is opposed to the fixed electrode 561 via the gap G2, and formed in an annular shape, the same shape as that of the fixed electrode 561. Further, a movable extraction electrode 564 extending from the outer circumference edge of the movable electrode 562 toward the apex C1 of the movable substrate 52 is provided on the movable substrate 52. The extending end part (the part located at the apex C1 of the movable substrate 52) of the movable extraction electrode 564 forms the movable electrode pad 564P connected to the control board 124.

The movable reflection film 55 is provided to be opposed to the fixed reflection film 54 via the gap G1 in the center part of a movable surface 521A of the movable part 521. As the movable reflection film 55, a reflection film having the same configuration as the above described fixed reflection film 54 is used.

Note that, in the embodiment, as described above, the example in which the gap G2 is larger than the gap G1 in dimension is shown, however, not limited to that. For example, depending on the wavelength region of light to be measured such that infrared light or far-infrared light is used as the light to be measured, the dimension of the gap G1 may be larger than the dimension of the gap G2.

The holding part 522 is a diaphragm surrounding the movable part 521, and formed to have a thickness dimension smaller than that of the movable part 521. The holding part 522 is more flexible than the movable part 521, and the movable part 521 can be displaced toward the fixed substrate 51 side by slight electrostatic attractive force. In this regard, the movable part 521 has the larger thickness dimension and the larger rigidity than those of the holding part 522, and thereby, even when the holding part 522 is pulled toward the fixed substrate 51 side by the electrostatic attractive force, the shape change of the movable part 521 does not occur. Therefore, the deflection of the movable reflection film 55 provided in the movable part 521 is not produced, and the fixed reflection film 54 and the movable reflection film 55 may be maintained constantly in the parallel condition.

Note that, in the embodiment, the holding part 522 having the diaphragm shape is exemplified, however, not limited to that. For example, a configuration in which beam-like holding parts arranged at equal angle intervals around the plane center point O are provided may be employed.

As described above, the substrate outer circumference part 525 is provided outside of the holding part 522 in the filter plan view. The surface of the substrate outer circumference part 525 opposed to the fixed substrate 51 includes the second joining part 523 opposed to the first joining part 513. Further, the second joining film 532 is provided in the second joining part 523 and the second joining film 532 is joined to the first joining film 531 as described above, and thereby, the fixed substrate 51 and the movable substrate 52 are joined.

Configuration of Imaging Unit

The imaging unit 123 may use an image sensor such as a CCD or CMOS or the like. The imaging unit 123 has photoelectric conversion elements corresponding to the respective pixels, and outputs a spectral image (image signals) with the light quantities received by the respective photoelectric conversion elements as the light quantities of the respective pixels to the control unit 15.

Configuration of Control Board

The control board 124 is a circuit board that controls the operation of the imaging module 12, and connected to the light-incident unit 121, the light source unit 122, the tunable interference filter 5, the imaging unit 123, etc. Further, the control board 124 controls the operations of the respective configurations based on control signals input from the control unit 15. For example, when an zooming operation is performed by the user, the control board 124 moves predetermined lenses of the light-incident unit 121 and changes the diaphragm diameter of the diaphragm. Further, when an operation of executing imaging of a spectral image of an imaging object is performed for component analysis, turning on and off of the light source unit 122 is controlled based on the control signal from the control unit 15. Furthermore, the control board 124 applies a predetermined voltage based on the control signal from the control unit 15 to the electrostatic actuator 56 of the tunable interference filter 5, and outputs the spectral image imaged in the imaging unit 123 to the control unit 15.

Configuration of Display

The display 13 is provided to face the display window of the casing 11. The display 13 may have any configuration that can display images, e.g., a liquid crystal panel or an organic EL panel.

Further, the display 13 of the embodiment also serves as a touch panel and also functions as a part of the operation unit 14.

Configuration of Operation Unit

As described above, the operation unit 14 includes a shutter button provided in the casing 11, a touch panel provided on the display 13, etc. When an input operation is performed by the user, the operation unit 14 outputs an operation signal in response to the input operation to the control unit 15. The operation unit 14 may include e.g., a plurality of operation buttons or the like in place of the touch panel, not limited to the above described configuration.

Configuration of Control Unit

The control unit 15 is formed by a combination of a CPU, a memory, etc., for example, and controls the entire operation of the spectroscopic analyzing apparatus 10. The control unit 15 includes a memory part 16 and a calculation part 17 as shown in FIG. 2.

The memory part 16 stores an OS for controlling the entire operation of the spectroscopic analyzing apparatus 10, programs for realization of various functions, and various kinds of data. Further, the memory part 16 has a temporary storage area that temporarily stores acquired spectral images, component analysis results, etc.

Further, in the memory part 16, as the various kinds of data, V-λ data representing relationships of wavelengths of light transmitted through the tunable interference filter 5 with the drive voltages applied to the electrostatic actuator 56 of the tunable interference filter 5 is stored.

Further, in the memory part 16, correlation data (e.g., calibration curves) representing correlations between feature quantities (absorbance at specific wavelengths) extracted from absorption spectra for the respective components to be analyzed and component content rates is stored.

The calculation part 17 executes various kinds of processing by reading the programs stored in the memory part 16, and functions as a light source control part 171, a module control part 172, a pixel detection part 173 (pixel detection unit), a light quantity correction part 174 (light quantity correction unit), a gray level correction part 175 (gray level correction unit), a component analysis part 176, and a display control part 177.

The light source control part 171 changes driving of the light source unit 122.

The module control part 172 controls the electrostatic actuator 56 to change the wavelength of the light transmitted through the tunable interference filter 5 with reference to the V-λ data. Further, the module control part 172 controls the imaging unit 123 to image spectral images.

The pixel detection part 173 detects abnormal pixels corresponding to the part in which the light from the light source unit 122 is specularly reflected by the surface of the imaging object and normal pixels other than the abnormal pixels based on the light quantities of the respective pixels of the acquired respective spectral images.

The light quantity correction part 174 corrects the light quantities of the abnormal pixels in the respective spectral images.

The gray level correction part 175 performs gray level correction of image data based on the maximum value of the light quantity correction values corrected by the light quantity correction part 174.

The component analysis part 176 calculates optical spectra of the respective pixels based on the spectral images with corrected light quantities of the abnormal pixels. Further, the component analysis part 176 performs a component analysis of the imaging object based on the calculated optical spectra of the respective pixels and the correlation data stored in the memory part 16.

When the imaging module 12 is controlled by the module control part 172 and an imaged image is acquired, the display control part 177 allows the display 13 to display the acquired imaged image. Further, the display control part 177 allows the display 13 to display the component analysis result calculated by the component analysis part 176.

The specific processing by the calculation part 17 will be described later.

Operation of Spectroscopic Analyzing Apparatus

Next, the operation by the above described spectroscopic analyzing apparatus 10 will be explained as below with reference to the drawings.

When a component analysis is performed by the spectroscopic analyzing apparatus 10 of the embodiment, first, initial processing of acquiring a reference received light quantity for calculation of absorbance is performed. The initial processing is performed by imaging with respect to a reference calibration plate (reference object) with a surface as a perfect diffuse reflection surface of e.g., $MgO_2$ or the like and measuring received light quantities (reference received light quantities) 10 at the respective wavelengths. Specifically, the calculation part 17 sequentially changes the voltage applied to the electrostatic actuator 56 using the module control part 172 to change the transmission wavelength at intervals of 10 nm, for example, with respect to a predetermined near-infrared wavelength region (e.g., 700 nm to 1500 nm). The received light quantities with respect to the respective wavelengths are detected by the imaging unit 123 and stored in the memory part 16.

Here, the calculation part 17 may use received light quantities at only one point of the reference calibration plate as the reference received light quantities, and may specify the pixel range of the reference calibration plate of the respective spectral images and calculate average values of the received light quantities in a predetermined number of pixels or all pixels within the specified pixel range.

Next, spectral image acquisition processing (image processing method) in the spectroscopic analysis processing using the spectroscopic analyzing apparatus 10 will be explained. In the embodiment, in the spectroscopic analyzing apparatus 10, spectral images for analysis at wavelength intervals of e.g., 10 nm in the infrared region are acquired, then, the optical spectra of the respective pixels in the respective spectral images for analysis are analyzed by the component analysis part 176, the absorption spectra corresponding to the components from the analyzed optical spectra is analyzed, and thereby, the component content rates contained in the imaging object etc. are analyzed. As below, processing of acquiring the spectral images for analysis (spectral image processing method) performed prior to the component analysis will be explained.

Figure 5:
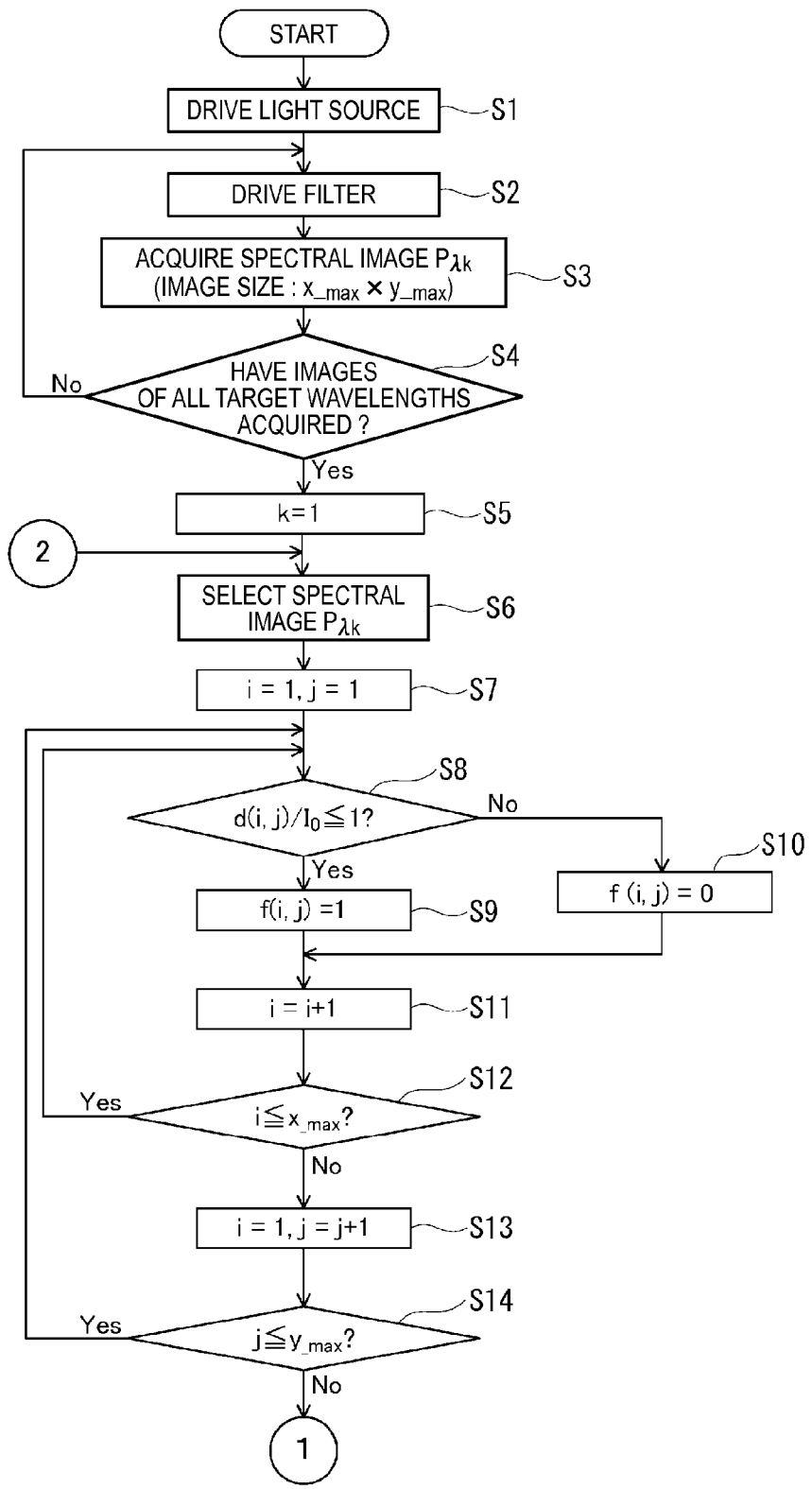
FIG. 5 is a flowchart showing spectral image acquisition processing in the spectroscopic analyzing apparatus of the embodiment.
Figure 6:
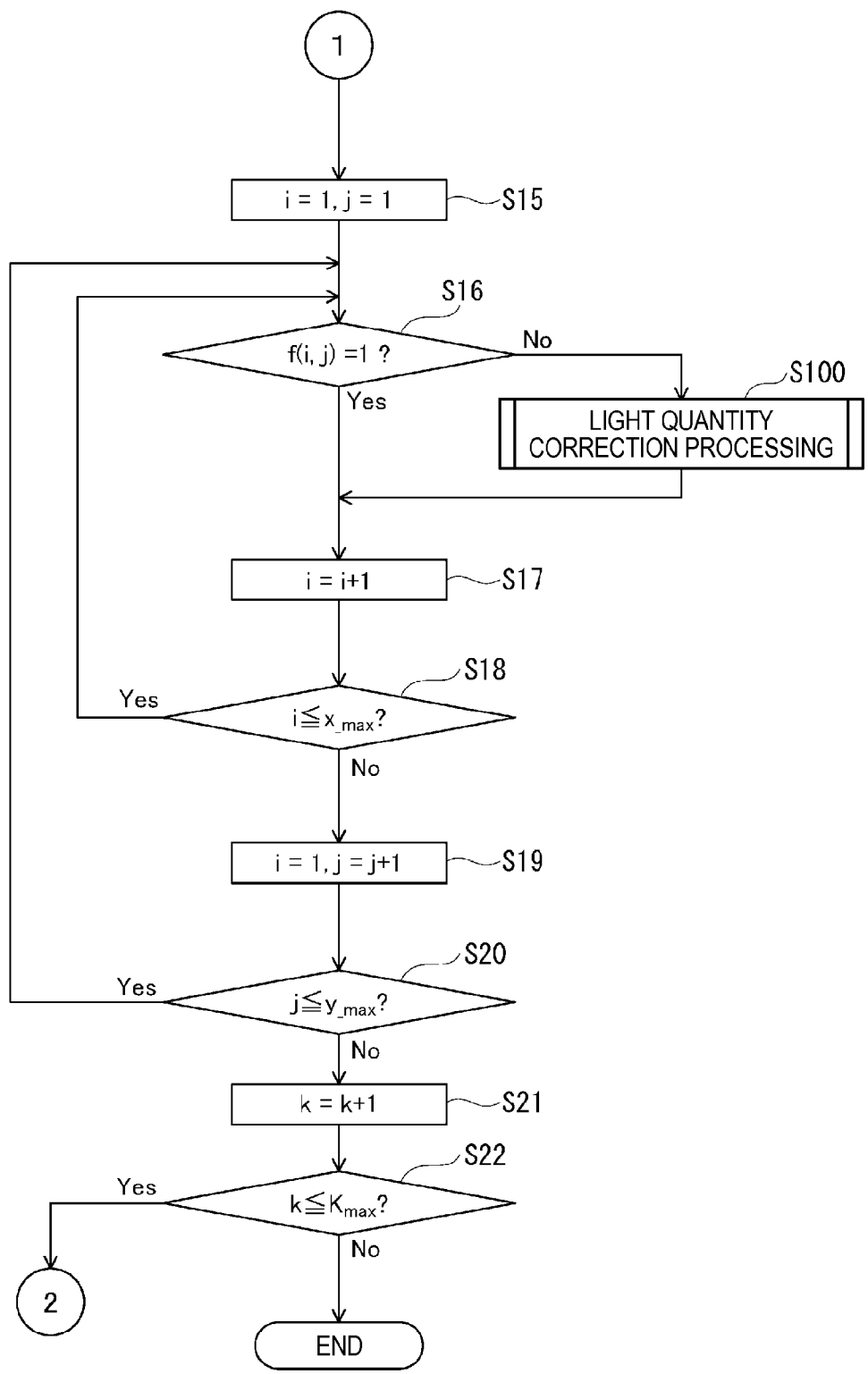
FIG. 6 is a flowchart showing the spectral image acquisition processing in the spectroscopic analyzing apparatus of the embodiment.
Figure 7:
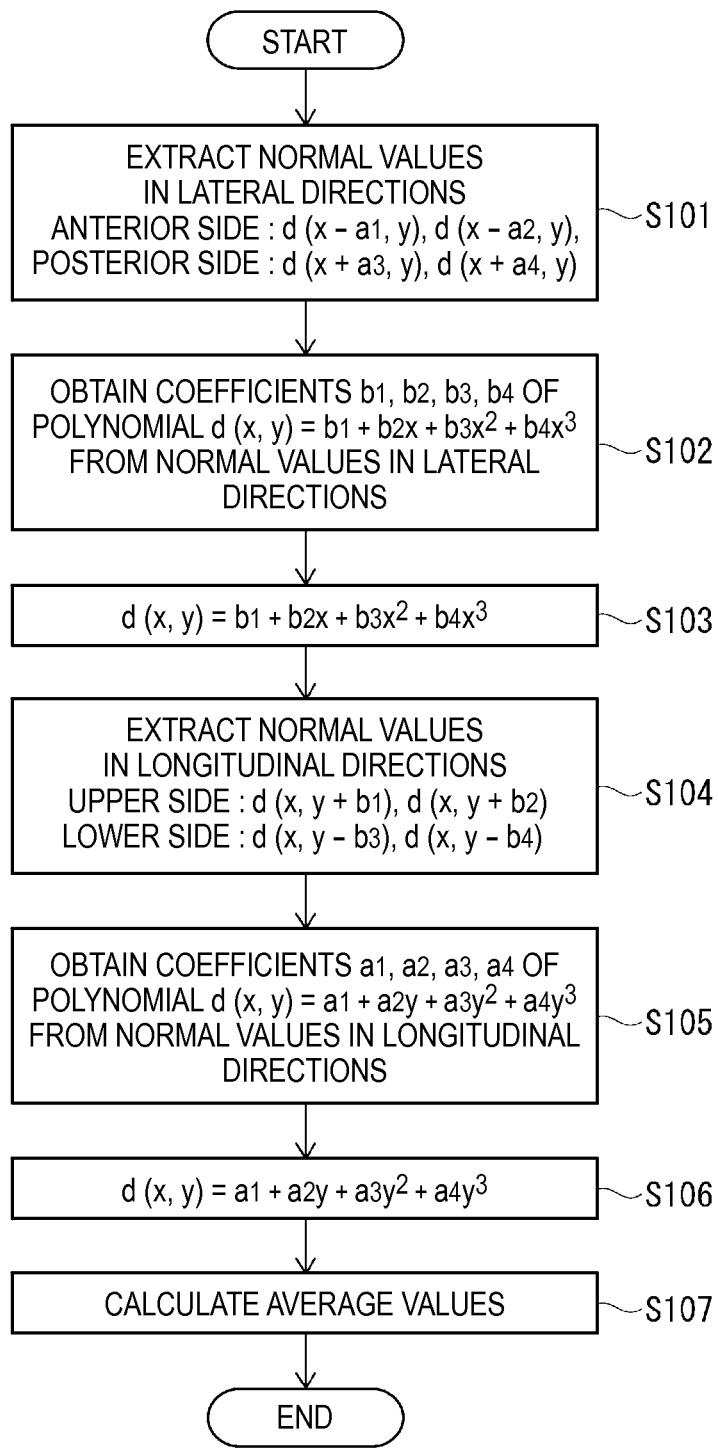
FIG. 7 is a flowchart showing light quantity correction processing in the spectroscopic analyzing apparatus of the embodiment.

FIGS. 5 to 7 are flowcharts of the spectral image acquisition processing by the spectroscopic analyzing apparatus 10.

As shown in FIG. 5, in the spectral image acquisition processing, first, the light source control part 171 controls the light source unit 122 to apply light to an imaging object (step S1). Further, the module control part 172 reads a drive voltage corresponding to a target wavelength with reference to the V-λ data stored in the memory part 16, and outputs a control signal for applying the drive voltage to the electrostatic actuator 56 to the control board 124 (step S2). Thereby, the gap dimension between the reflection films 54, 55 of the tunable interference filter 5 is changed, and the light having the target wavelength may be transmitted through the tunable interference filter 5.

Through the steps S1, S2, the reflection light from the imaging object is allowed to enter the tunable interference filter 5 from the light-incident unit 121, and light having a predetermined wavelength in response to the dimension of the gap G1 between the reflection films 54, 55 is transmitted through the tunable interference filter 5 toward the imaging unit 123 side. The transmitted light is received by the imaging unit 123, and a spectral image Pλk is imaged (step S3). The imaged spectral image Pλk is output to the control unit 15 and stored in the memory part 16.

Here, in the following explanation, the image size of the imaged spectral image Pλk is expressed by x_max×y_max and the light quantity of the pixel (x,y) of the spectral image Pλk is expressed by d(x,y).

Figure 8:
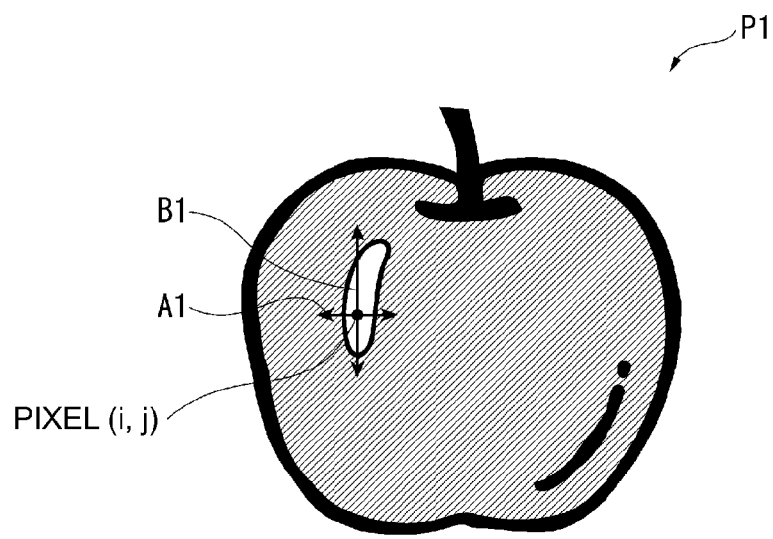
FIG. 8 shows an example of a spectral image acquired in the embodiment.

FIG. 8 shows an example of the acquired spectral image.

Part of the light from the light source unit 122 is specularly reflected by a part of the surface of the imaging object and allowed to enter the light-incident unit 121. Therefore, as shown in FIG. 8, there is a pixel having a larger light quantity (brightness) than the reference light quantity I0 in the spectral image.

Then, the module control part 172 determines whether or not there is another unacquired spectral image (step S4). If there is an unacquired spectral image at step S4, the process returns to step S2 and continues the acquisition processing of the spectral images. Note that the target wavelength of the acquired spectral image (the wavelength corresponding to the drive voltage set at step S1) may be set according to the component on which the analysis processing is performed by the spectroscopic analyzing apparatus 10 or appropriately set by a measurer, for example. When amounts of components of fat, sugar, protein, and water and calories of a food are detected by the spectroscopic analyzing apparatus, wavelengths at which the feature quantities for at least fat, sugar, protein, and water are obtained may be set as the target wavelengths, and whether or not the spectral images of the target wavelengths are acquired may be determined at step S4.

Note that the spectral images at predetermined wavelength intervals (e.g., 10 nm intervals) may be sequentially acquired.

In the above described manner, the respective spectral images Pλk corresponding to the target wavelengths λk (k=1, 2, 3, . . . Kmax) are acquired.

At step S4, if the acquisition of the spectral images Pλk of all of the target wavelengths is determined, abnormal pixel correction processing of the spectral images is performed.

In the processing, first, the pixel detection part 173 initializes the setting variable k (k=1) for selection of the spectral images (step S5).

Then, the pixel detection part 173 selects the spectral image Pλk (step S6), and further initializes setting variables i, j for setting the pixel positions to be detected (i=1, j=1) (step S7).

Then, a ratio of the light quantity d(i,j) of the pixel (i,j) of the spectral image Pλk to the reference light quantity I0 (reflectance ratio) is calculated, and the reflectance ratio is determined whether it is equal to or less than one (step S8). That is, the light quantity d(i,j) is determined whether it is equal to or less than the reference light quantity I0. Note that, when the reflectance ratio of a first spectral image having a wavelength A is calculated, the reference light quantity I0 for the wavelength A is used.

At step S8, if d(i,j)/I0≤1, the pixel (i,j) is determined as "normal pixel" not the pixel corresponding to the specular reflection part, and inputs "1" to flag data f(i,j) for the pixel (i,j) (step S9).

On the other hand, at step S8, if d(i,j)/I0>1, the pixel (i,j) is determined as "abnormal pixel", the pixel corresponding to the specular reflection part, and inputs "0" to the flag data f(i,j) for the pixel (i,j) (step S10).

Then, after step S9 or step S10, the pixel detection part 173 adds "1" to the setting variable i (step S11: i=i+1), and determines whether or not the x-coordinate of the image expressed by the setting variable i is within the image size (i≤x_max) (step S12).

At step S12, if determining "Yes", the process returns to step S8.

On the other hand, if determining "No" at step S12, the pixel detection part 173 initializes the setting variable i (i=1), adds "1" to the setting variable j (step S13: j=j+1), and determines whether or not the y-coordinate of the image expressed by the setting variable j is within the image size (j≤y_max) (step S14).

At step S14, if determining "Yes", the process returns to step S8.

On the other hand, if determining "No" at step S14, as shown in FIG. 6, the light quantity correction part 174 initializes the setting variables i, j (i=1, j=1) (step S15) like step S7. Then, the light quantity correction part 174 determines whether or not the flag data f(i,j) is "1" with respect to the pixel (i,j) (step S16). That is, the pixel (i,j) is determined whether it is a normal pixel.

At step S16, if determining "No", i.e., the pixel (i,j) is an abnormal pixel, light quantity correction processing is performed (step S100).

Figure 10:
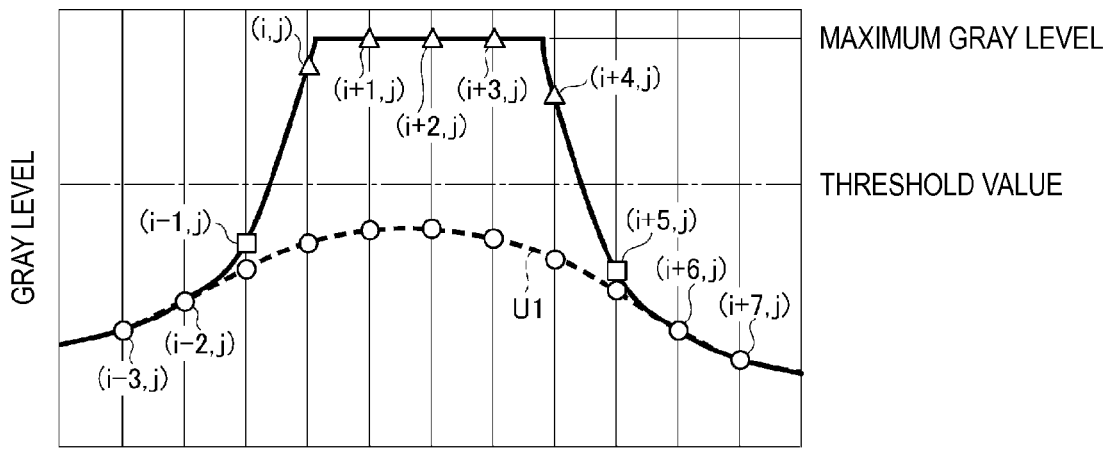
FIG. 10 shows an example of polynomial approximation of abnormal values in the light quantity correction processing of the embodiment.
Figure 11:
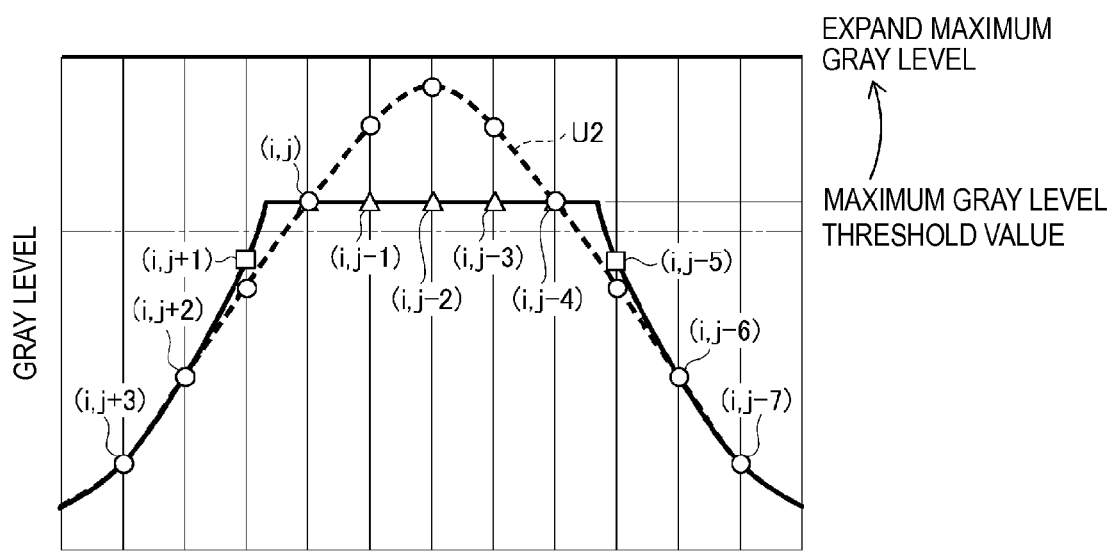
FIG. 11 shows an example of polynomial approximation of gray level correction processing of the embodiment.

FIG. 10 shows an example of polynomial approximation of abnormal values in the light quantity correction processing of the embodiment, and schematically shows pixels on a straight line A1 containing the pixel (i,j) of the spectral image shown in FIG. 8. FIG. 11 shows an example of polynomial approximation of abnormal values in the light quantity correction processing of the embodiment, and schematically shows pixels on a straight line B1 containing the pixel (i,j) of the spectral image shown in FIG. 8.

In the light quantity correction processing at step S100, the processing shown in FIG. 7 is performed.

First, if the pixel (i,j) shown in FIG. 8 is an abnormal pixel, the light quantity correction part 174 extracts normal values in the x-direction of the pixel (i,j) (step S101). Specifically, if the pixel (i,j) is an abnormal pixel, the light quantity correction part 174 determines whether or not adjacent pixels (i−1,j) (i+1,j) are abnormal pixels. If the adjacent pixels are abnormal pixels, the pixels (i−2,j) (i+2,j) next to the adjacent pixels are determined whether they are abnormal pixels. In this manner, the light quantity correction part 174 detects a range of the adjacent abnormal pixels.

It is highly likely that the pixel adjacent to the pixel detected as the abnormal pixel by specular reflection is effected by the specular reflection even when its light quantity is normal, for example. Therefore, the light quantity correction part 174 excludes the normal pixels adjacent to the abnormal pixel within a predetermined distance range and extracts the light quantities of the normal pixels adjacent to the excluded normal pixels as normal values.

For example, if determining that the pixel (i,j) to the pixel (i+4,j) are abnormal pixels, the light quantity correction part 174 excludes the adjacent pixel (i−1,j) anterior to the pixel (i,j) (at the negative side in the x-direction), and further acquires light quantities of the normal pixel (i−2,j) adjacent to the pixel (i−1,j) and the normal pixel (i−3,j) adjacent to the normal pixel (i−2,j) as normal values. Then, the light quantity correction part 174 excludes the adjacent pixel (i+5,j) posterior to the pixel (i+4,j) (at the positive side in the x-direction), and further acquires light quantities of the normal pixel (i+6,j) adjacent to the pixel (i+5,j) and the normal pixel (i+7,j) adjacent to the normal pixel (i+6,j) as normal values.

Then, the light quantity correction part 174 calculates coefficients b1, b2, b3, b4 of a polynomial $d(x,y)=b1+b2x+b3x^2+b4x^3$ from the normal values acquired at step S101 (step S102).

Specifically, the light quantity correction part 174 substitutes the pixel coordinates of the respective normal pixels (i−2,j), (i−3,j), (i+6,j), (i+7,j) and the light quantities d(i−2,j), d(i−3,j), d(i+6,j), d(i+7,j) acquired at step S101 in the polynomial and calculates the coefficients b1, b2, b3, b4.

Note that, in the embodiment, the example in which normal values of two pixels anterior and posterior to the abnormal pixel are extracted and the coefficients of the four-term polynomial are calculated is shown, however, not limited to that. For example, a polynomial containing five or more terms may be used and, in this case, the normal values to be acquired may be increased according to the number of terms.

In this manner, using the coefficients b1, b2, b3, b4 calculated at step S102, the light quantity correction part 174 temporarily stores the pixels (i,j), (i+1,j), (i+2,j), (i+3,j), (i+4,j), (i+5,j) determined as the abnormal pixels with light quantity correction values of the normal pixel $d(x,y)=b1+b2x+b3x^2+b4x^3$ in the memory part 16 (step S103). Specifically, as shown in FIG. 10, the light quantity correction part 174 temporarily replaces the light quantities of the pixels determined as the abnormal pixels by light quantity correction values of pixels located on a curve U1 expressed by the polynomial approximation (a broken line part in FIG. 10).

Then, the light quantity correction part 174 extracts the normal values in the y-direction of the pixel (i,j) like the detection of the normal values in the x-direction (step S104). Specifically, if the pixel (i,j) is an abnormal pixel, the light quantity correction part 174 determines whether or not the adjacent pixels (i,j+1) (i,j−1) are abnormal pixels. If the adjacent pixels are abnormal pixels, the pixels (i,j+2) (i,j−2) next to the adjacent pixels are determined whether they are abnormal pixels. In this manner, the light quantity correction part 174 detects a range of the adjacent abnormal pixels.

Further, as described above, it is highly likely that the pixel adjacent to the pixel detected as the abnormal pixel by specular reflection is effected by the specular reflection even when its light quantity is normal, for example. Therefore, the light quantity correction part 174 excludes the normal pixels adjacent to the abnormal pixel within a predetermined distance range and extracts the light quantities of the normal pixels adjacent to the excluded normal pixels as normal values.

For example, if determining that the pixel (i,j) to the pixel (i,j−4) are abnormal pixels, the light quantity correction part 174 excludes the adjacent pixel (i,j+1) above the pixel (i,j) (at the positive side in the y-direction), and further acquires light quantities of the normal pixel (i,j+2) adjacent to the pixel (i,j+1) and the normal pixel (i,j+3) adjacent to the normal pixel (i,j+2) as normal values. Then, the light quantity correction part 174 excludes the adjacent pixel (i,j−5) below the pixel (i,j−4) (at the negative side in the y-direction), and further acquires light quantities of the normal pixel (i,j−6) adjacent to the pixel (i,j−5) and the normal pixel (i,j−7) adjacent to the normal pixel (i,j−6) as normal values.

Then, the light quantity correction part 174 calculates coefficients a1, a2, a3, a4 of a polynomial $d(x,y)=a1+a2y+a3y^2+a4y^3$ from the normal values acquired at step S104 (step S105).

Specifically, the light quantity correction part 174 substitutes the pixel coordinates of the respective normal pixels (i,j+2), (i,j+3), (i,j−6), (i,j−7) and the light quantities d(i,j+2), d(i,j+3), d(i,j−6), d(i,j−7) acquired at step S104 in the polynomial and calculates the coefficients a1, a2, a3, a4.

In this manner, using the coefficients a1, a2, a3, a4 calculated at step S105, the light quantity correction part 174 temporarily stores the pixels (i,j), (i,j−1), (i,j−2), (i,j−3), (i,j−4), (i,j−5) determined as the abnormal pixels with light quantity correction values of the normal pixel $d(x,y)=a1+a2y+a3y^2+a4y^3$ in the memory part 16 (step S106). Specifically, as shown in FIG. 11, the light quantity correction part 174 temporarily replaces the light quantities of the pixels determined as the abnormal pixels by light quantity correction values of pixels located on a curve U2 expressed by the polynomial approximation (a broken line part in FIG. 11).

Then, the light quantity correction part 174 calculates average values of the light quantity correction values obtained at the above described steps S103 and S106, i.e., the light quantity correction values in the x-axis direction (lateral direction) and the light quantity correction values in the y-axis direction (longitudinal direction) by polynomial approximation, and replaces the light quantity correction values by the average values of the light quantity correction values (step S107).

Figure 9:
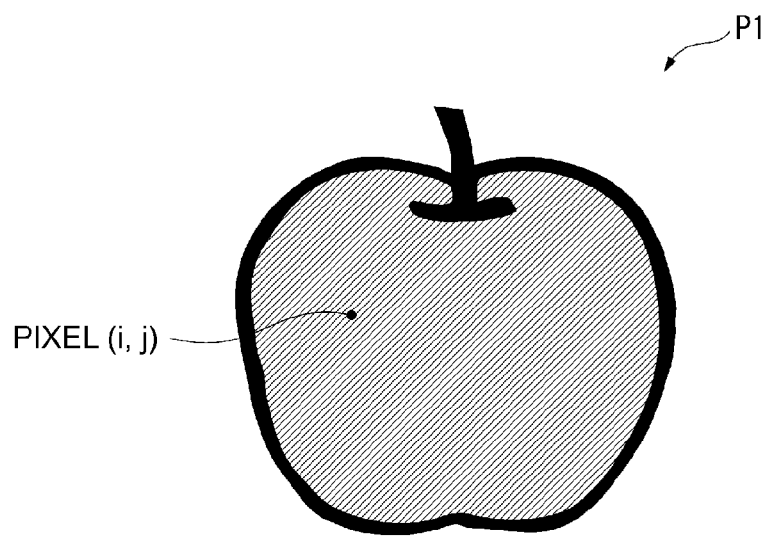
FIG. 9 shows an example of a spectral image with corrected light quantities in the embodiment.

FIG. 9 shows an example of a spectral image with corrected light quantities. Through the light quantity correction processing at step S100, the abnormal pixel (i,j) corresponding to the specular reflection part as shown in FIG. 8 is replaced by the normal light quantity as shown in FIG. 9.

The light quantity for the specular reflection part reaches the upper limit corresponding to a saturated exposure quantity of a light receiving element, and the light quantity before correction by the light quantity correction part 174 is fixed. Typically, the light quantity for the upper limit is used as the maximum gray level (e.g., 255 in eight bits) and the gray levels of the respective pixels of image data are recorded.

On the other hand, in the embodiment, the light quantities of the respective pixels determined as the abnormal pixels are calculated by polynomial approximation as described above, and thereby, the light quantities of the abnormal pixels may exceed the upper limit. In this case, the gray level correction part 175 corrects the gray levels of the respective pixels based on the calculated maximum light quantity of the respective abnormal pixels. Specifically, as shown in FIG. 11, the gray level correction part 175 expands the maximum gray level based on the calculated maximum light quantity of the respective abnormal pixels. For example, the image data recorded in eight bits (256 levels) before correction is expanded in nine bits (512 levels) or the like.

Thereby, image data accurately reflecting the corrected light quantities may be acquired and, for display of the image data, a high-accuracy image at accurate gray levels may be displayed.

Returning to FIG. 6, after the step S100 and at step S16, if determining "Yes", the light quantity correction part 174 adds "1" to the setting variable i (step S17: i=i+1), and determines whether or not the x-coordinate of the image expressed by the setting variable i is within the image size (i≤x_max) (step S18).

At step S18, if determining "Yes", the process returns to step S16.

On the other hand, if determining "No" at step S18, the light quantity correction part 174 initializes the setting variable i (i=1), adds "1" to the setting variable j (step S19: j=j+1), and determines whether or not the y-coordinate of the image expressed by the setting variable j is within the image size (j≤y_max) (step S20).

At step S20, if determining "Yes", the process returns to step S16.

At step S20, if determining "No", the spectral image Pλk in which the light quantities of the respective abnormal pixels are replaced by the light quantity correction values is acquired and stored in the memory part 16.

Then, "1" is added to the setting variable k for selection of the spectral image (step S21: k=k+1), and k≤Kmax is determined whether it is held (step S22). At step S22, if determining "Yes", the process returns to step S6. On the other hand, if determining "No" at step S22, the spectral image acquisition processing is ended because the spectral images with the corrected light quantities of the abnormal pixels for the respective target wavelengths λk (k=1, 2, 3, . . . Kmax) are acquired.

Advantages of Embodiment

In the spectroscopic analyzing apparatus 10 of the embodiment, light is applied from the light source unit 122 to the imaging object, the reflection light is allowed to enter the tunable interference filter 5, the light having the wavelength in response to the dimension of the gap G1 between the reflection films 54, 55 is transmitted, the light is imaged by the imaging unit 123, and thereby, a spectral image is acquired. The pixel detection part 173 calculates the light quantities of the respective pixels of the imaged spectral image and the reflectance ratios as ratios to the reference light quantity, and detects the pixels having the reflectance ratios larger than one as abnormal pixels and the pixels having the reflectance ratios equal to or smaller than one as normal pixels. The light quantity correction part 174 calculates the light quantity correction values by polynomial approximation based on the light quantities of the normal pixels located within a predetermined distance range containing the abnormal pixel (e.g., on the straight line A1). Then, the light quantity correction part 174 replaces the light quantity of the abnormal pixel by the light quantity correction value calculated by polynomial approximation.

Accordingly, even when the light from the light source unit 122 is specularly reflected by the surface of the imaging object and causes brightness abnormality in the spectral image, the light quantities of the abnormal pixels may be replaced by the appropriate light quantities based on the light quantities of the normal pixels, and the spectral image without abnormal pixels may be acquired.

Therefore, spectrometry is performed based on the spectral images, and no abnormal pixels with light quantities higher than the reference light quantities are contained. Thus, the optical spectra in the respective pixels from the spectral images of the respective wavelengths may be accurately calculated, and thereby, the component analysis of the imaging object may be performed with higher accuracy.

Further, the light quantity correction part 174 uses the average values of the light quantity correction values in the x-axis direction (on the straight line A1) calculated by polynomial approximation and the light quantity correction values in the y-axis direction (on the straight line B1) calculated by polynomial approximation as the light quantity correction values, and accuracy may be improved compared to the case where the light quantities are corrected using only the light quantity correction values in the x-axis direction. Furthermore, even when the light quantities of the abnormal pixels are unknown, by replacement by the average values of the light quantity correction values calculated by polynomial approximation, the light quantities of the pixels may be replaced by values closer to the actual light quantities, and spectral images with higher accuracy may be acquired. In addition, the average values of the light quantity correction values in both directions of the x-axis direction and the y-axis direction are used as the light quantity correction values, and thereby, variations in light quantities in the normal pixels may be suppressed and the light quantity correction values with higher accuracy may be calculated.

Other Embodiments

The invention is not limited to the above described embodiment, but the invention includes alterations, improvements, etc. within the range in which the purpose of the invention can be achieved.

For example, in the above described embodiment, the example of spectroscopic analyzing apparatus 10 is shown, however, the invention may be applied to general spectroscopic cameras that do not perform component analyses of imaging objects or the like.

Further, in the above described embodiment, the spectroscopic analyzing apparatus 10 having the spectroscopic camera that acquires spectral images is exemplified, however, not limited to that. For example, the invention may be applied to general cameras that image color images or the like. Also, in this case, like the above described embodiment, the reflectance ratios of respective pixels are calculated based on light quantities of the respective pixels of imaged images (e.g., respective RGB monochrome images in a color image imaged via RGB color filters) and reference light quantities, abnormal pixels are detected if the reflectance ratios exceed a predetermined value and normal pixels are detected if the reflectance ratios are equal to or less than the predetermined value, and the light quantities of the abnormal pixels are corrected based on the light quantities of the normal pixels.

Figure 12:
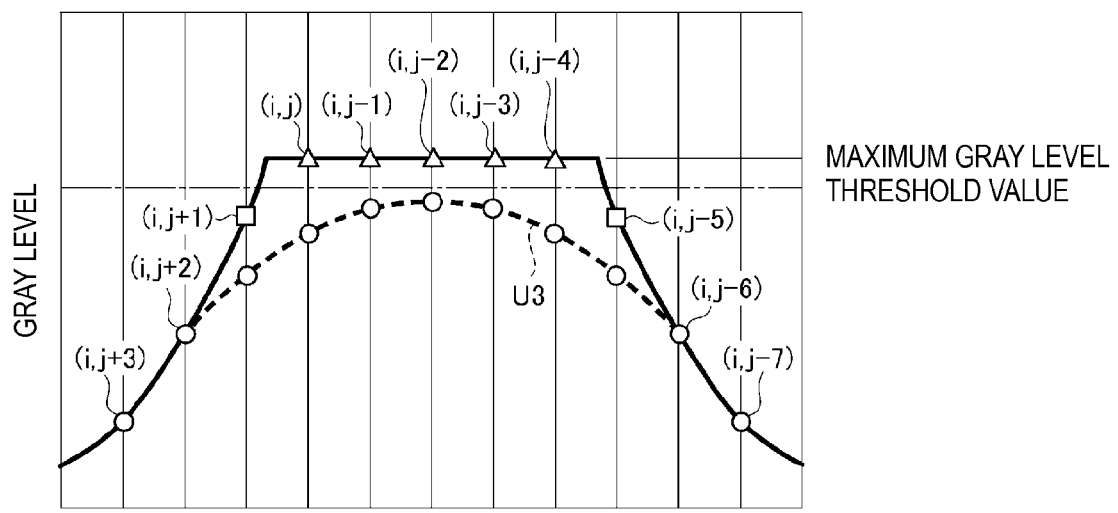
FIG. 12 shows an example of polynomial approximation of gray level correction processing of a modified example of the embodiment.

Furthermore, in the above described embodiment, the gray level correction part 175 acquires the image data reflecting the light quantities obtained by the polynomial by expanding the maximum gray level. On the other hand, the gray level correction part 175 may acquire image data reflecting light quantities obtained by a polynomial by compressing the gray level values as shown by a broken line U3 in FIG. 12.

Specifically, the gray level correction part 175 corrects the gray levels of the respective pixels with the gray level for the calculated maximum light quantity of the respective abnormal pixels as "255". In this case, the number of bits of the image data does not change and increase in data size of the image data may be suppressed.

Further, in the above described embodiment, the light quantity correction values in the x-direction and the light quantity correction values in the y-direction are calculated, however, for example, the light quantity correction values in one of the directions may be calculated. That is, either of steps S101 to S103 or steps S104 to S106 may be executed. Accordingly, abnormal pixels may be replaced by normal pixels only by obtaining the light quantity correction values in one of the x-direction and the y-direction, and spectral images without abnormal pixels may be provided more quickly.

Furthermore, in the above described embodiment, the light quantity correction values in the x-direction and the light quantity correction values in the y-direction are calculated, however, additionally, light quantity correction values in an oblique direction (e.g., a direction at a tilt of 45° from the x-direction and the y-direction) may be calculated. Accordingly, more accurate spectral images without abnormal pixels may be provided. Alternatively, only the light quantity correction values in the oblique direction may be calculated.

In addition, in the above described embodiment, at step S101 and step S104, for acquisition of the normal pixels, the respective two normal pixels at the anterior side and the posterior side and the respective two normal pixels at the upper side and the lower side are acquired, however, not limited to that. For example, respective three or more normal pixels at the anterior side and the posterior side and the respective three or more normal pixels at the upper side and the lower side may be acquired. Accordingly, the light quantity correction values by polynomial approximation may be more accurate values, and thereby, extremely accurate spectral images without abnormal pixels may be provided.

In the above described embodiment, the pixel detection part 173 may detect abnormal pixels with light quantities of respective pixels having differences from light quantities of pixels adjacent to the respective pixels equal to or more than a predetermined value. Accordingly, the abnormal pixels with light quantities of the respective pixels having differences from light quantities of the pixels adjacent to the respective pixels equal to or more than the predetermined value are detected, and thereby, compared to the case where all light quantities of pixels equal to or more than a predetermined value are detected as abnormal values, pixels having larger amounts of change with respect to the adjacent pixels may be detected as abnormal pixels. Therefore, the pixels having larger amounts of change in light quantity within the pixel area may be excluded, and the probability of correction of the light quantities of the abnormal pixels using more appropriate light quantities may be higher.

In the above described embodiment, the example in which whether or not the reflectance ratio (d(i,j)/I0) is equal to or less than the predetermined value (one) is determined is shown, however, not limited to that. For example, an input unit for setting a predetermined value input by an operation of the operation unit 14 by a user as a value for determination of normal pixels or abnormal pixels may be provided.

In this case, under situations in which normal light quantity correction is impossible such that the reflectance ratios for the respective pixels in acquired images are entirely higher, for example, detection sensitivity of abnormal pixels may be reduced by appropriately changing the predetermined value as a threshold value, and the images may be made closer to images with less specular reflection parts.

Further, as the input unit, not limited to the configuration of acquiring values based on the user operation, but, for example, if the number of abnormal pixels in the acquired image exceeds a predetermined upper limit, processing of reducing the predetermined value for determination of normal pixels or abnormal pixels or the like may be performed. In this case, the same advantages as those described above are obtained.

In the above described embodiment, when the pixel area with respect to the abnormal pixel (i,j) is set, the light quantity correction part 174 may perform processing of announcing abnormality by alert (e.g., display on the display, annunciation by sound) if the number of abnormal pixels contained within the pixel area is equal to or more than a predetermined first threshold value or the ratio of the number of normal pixels to the number of abnormal pixels is less than a predetermined second threshold value. Further, re-measurement (re-imaging) may be performed and spectral images may be re-acquired.

Furthermore, the light quantity correction part 174 may determine whether or not there is an edge part in which the light quantity largely varies between adjacent normal pixels within the pixel area. Then, if determining that there is the edge part, the direction of the abnormal pixel (i,j) with respect to the pixel in the edge part may be detected and the pixel area may be set not to cross the edge part. In this case, an area in which the light quantity largely varies in the edge part or the like may be excluded, and accurate light quantity correction values may be calculated.

In the above described embodiment, the tunable interference filter 5 housed within a package may be incorporated in the spectroscopic analyzing apparatus 10. In this case, the package is sealed with vacuum, and thereby, the drive responsiveness when a voltage is applied to the electrostatic actuator 56 of the tunable interference filter 5 may be improved.

In the above described embodiment, light is applied to the reference calibration plate having the perfect diffuse reflection surface and the received light quantity is used as the reference light quantity I0, and the pixel detection part 173 calculates the reflectance ratio based on the reference light quantity I0. On the other hand, for example, a reference calibration plate that absorbs part of light on the surface, not serves as a perfect diffuse reflection surface or the like may be used. In this case, the pixel detection part 173 may determine an abnormal pixel or not by determining whether or not the reflectance ratio is equal to or less than a predetermined value smaller than one.

The tunable interference filter 5 has the electrostatic actuator 56 that varies the gap dimension between the reflection films 54, 55 by voltage application, however, the filter is not limited to that.

For example, a dielectric actuator in which a first dielectric coil is provided in place of the fixed electrode 561 and a second dielectric coil or a permanent magnet is provided in place of the movable electrode 562 may be used.

Further, a configuration using a piezoelectric actuator in place of the electrostatic actuator 56 may be employed. In this case, for example, a lower electrode layer, a piezoelectric film, and an upper electrode layer are stacked in the holding part 522 and a voltage applied between the lower electrode layer and the upper electrode layer is varied as an input value, and thereby, the piezoelectric film may be expanded and contracted and the holding part 522 may be bent.

Furthermore, in the above described embodiment, as the Fabry-Perot etalon, the tunable interference filter 5 in which the fixed substrate 51 and the movable substrate 52 are joined to be opposed to each other, the fixed reflection film 54 is provided on the fixed substrate 51, and the movable reflection film 55 is provided on the movable substrate 52 is exemplified, however, the filter is not limited to that.

For example, a configuration in which the fixed substrate 51 and the movable substrate 52 are not joined and a gap change part that changes the gap between reflection films of a piezoelectric element or the like is provided between the substrates may be employed.

Further, the configuration is not limited to the example having the two substrates. For example, a tunable interference filter in which two reflection films are stacked on one substrate via a sacrifice layer and a gap is formed by removing the sacrifice layer by etching or the like may be used.

Furthermore, as the spectroscopic device, for example, an AOTF (Acousto Optic Tunable Filter) or an LCTF (Liquid Crystal Tunable Filter) may be used. Note that, in this case, it may be difficult to downsize the spectroscopic camera (spectroscopic analyzing apparatus 10), and the Fabry-Perot etalon is preferably used.

In addition, in the above described embodiment, the tunable interference filter 5 in which the transmission wavelength may be changed by changing the gap G1 between the reflection films 54, 55 is exemplified, however, not limited to that. For example, a fixed-wavelength interference filter (Fabry-Perot etalon) may be employed. In this case, light quantities of abnormal pixels may be appropriately corrected in a spectral image of a specific wavelength in response to the gap between reflection films of the interference filter.

The other specific structures when the invention is embodied may be appropriately changed to other structures etc. within the range in which the purpose of the invention can be achieved.

The entire disclosure of Japanese Patent Application No. 2013-268713 filed on Dec. 26, 2013 is expressly incorporated by reference herein.

What is claimed is:

1. A camera comprising:
   a light source that applies a source light to an imaging object, the source light having a predetermined source light quantity;
   an imaging sensor that acquires an image by imaging a reflected light that is formed by reflecting the source light from the light source by the imaging object, the reflected light having a reflected light quantity; and
   a controller having a CPU and a memory, the controller being configured to:
      detect an abnormal pixel in the image acquired by the imaging sensor based on a light quantity ratio of the reflected light quantity to the predetermined source light quantity, the abnormal pixel having the light quantity ratio of 1 or more;
      detect a normal pixel in the image acquired by the imaging sensor based on the light quantity ratio, the normal pixels having the light quantity ratio of less than 1, the normal pixel being located within a predetermined distance from the abnormal pixel; and
      calculate a light quantity correction value based on the light quantity ratio of the normal pixel and replace the reflected light quantity of the abnormal pixel by a corrected light quantity corresponding to the light quantity correction value,
   wherein the light quantity correction value is calculated by polynomial approximation.

2. The camera according to claim 1, further comprising a spectroscopic device that is configured to select a light having a predetermined wavelength by spectroscopically separating the reflected light reflected by the imaging object,
   wherein the imaging sensor acquires the image by imaging the light having the predetermined wavelength.

3. The camera according to claim 1, wherein the controller is configured to:
   calculate, with respect to an x-axis direction and a y-axis direction of the pixel, an x-axis light quantity correction value in the x-axis direction and a y-axis light quantity correction value in the y-axis direction by the polynomial approximation; and replace the light quantity correction value by an average value of the x-axis light quantity correction value and the y-axis light quantity correction value.

4. The camera according to claim 1, wherein the controller is configured to perform gray level correction of image data of the image based on a maximum value of the light quantity correction value.

5. The camera according to claim 1, further comprising an input device that inputs a reference value of 1 for the light quantity ratio.

6. The camera according to claim 1, further comprising an input device that inputs the predetermined distance.

7. The camera according to claim 2, wherein the spectroscopic device is configured to change the predetermined wavelength to a different wavelength.

8. The camera according to claim 2, wherein the spectroscopic device is a tunable Fabry-Perot etalon.

9. An image processing method in a camera, the camera including:
   a light source that that applies a source light to an imaging object, the source light having a predetermined source light quantity; and
   an imaging sensor that acquires an image by imaging a reflected light that is formed by reflecting the source light from the light source by the imaging object, the reflected light having a reflected light quantity, the image processing method for causing a controller to execute a process, the method comprising on the controller the steps of:
   detecting an abnormal pixel in the image acquired by the imaging sensor based on a light quantity ratio of the reflected light quantity to the predetermined source light quantity, the abnormal pixel having the light quantity ratio of 1 or more;
   detecting a normal pixel in the image acquired by the imaging sensor based on the light quantity ratio, the normal pixels having the light quantity ratio of less than 1, the normal pixel being located within a predetermined distance from the abnormal pixel; and
   calculating a light quantity correction value based on the light quantity ratio of the normal pixel, and
   replacing the reflected light quantity of the abnormal pixel by a corrected light quantity corresponding to the light quantity correction value,
   wherein the light quantity correction value is calculated by polynomial approximation.

10. A camera comprising:
    a light source that irradiates a source light to an imaging object and a reference object;
    an imaging sensor that acquires an image based on a first reflected light that is formed by reflecting the source light from the light source by the imaging object and that acquires a second reflected light that is formed by reflecting the source light from the light source by the reference object, the first and second reflected lights having first and second reflected light quantities, respectively;
    a controller having a CPU and a memory, the controller being configured to:
      detect an abnormal pixel in the image acquired by the imaging sensor based on a light quantity ratio of the first reflected light quantity to the second reflected light quantity, the abnormal pixel having the light quantity ratio of 1 or more;
      detect a normal pixel in the image acquired by the imaging sensor based on the light quantity ratio, the normal pixels having the light quantity ratio of less than 1, the normal pixel being located within a predetermined distance from the abnormal pixel; and
      calculate a light quantity correction value based on the light quantity ratio of the normal pixel and replace the first reflected light quantity of the abnormal pixel to a corrected light quantity corresponding to the light quantity correction value, wherein
    the light quantity correction value is calculated by polynomial approximation.

* * * * *